US00RE46289E

(19) United States
(12) Reissued Patent
Peron

(10) Patent Number: US RE46,289 E
(45) Date of Reissued Patent: Jan. 31, 2017

(54) MEDICAL DRESSING

(71) Applicant: Smith & Nephew PLC, London (GB)

(72) Inventor: Yannick Louis Peron, East Yorkshire (GB)

(73) Assignee: Smith & Nephew PLC, London (GB)

(21) Appl. No.: 29/510,717

(22) Filed: Dec. 2, 2014

Related U.S. Patent Documents

Reissue of:
(64) Patent No.: Des. 679,820
Issued: Apr. 9, 2013
Appl. No.: 29/389,783
Filed: Apr. 15, 2011

(30) Foreign Application Priority Data

Oct. 15, 2010 (GB) ..... 4017442
Oct. 15, 2010 (GB) ..... 4017443

(51) LOC (10) Cl. ..... 24-04
(52) U.S. Cl.
USPC ..... D24/189; D24/184
(58) Field of Classification Search
USPC ... D24/189; 424/447–449; 428/40.1, 43, 57, 428/139, 343, 352, 38; 602/41–47, 52, 602/58; 604/304, 306, 307
(Continued)

(56) References Cited

U.S. PATENT DOCUMENTS 2,613,696 A * 10/1952 MacIntyre ..... 139/418
2,682,873 A 7/1954 Evans et al.
(Continued)

FOREIGN PATENT DOCUMENTS

EP 0 619 105 A1 10/1994
EP 2098257 A1 9/2009
(Continued)

OTHER PUBLICATIONS

Allevyn Educational Booklet, Smith & Nephew Medical Ltd, Apr. 2014.
(Continued)

*Primary Examiner* — Darlington Ly
(74) *Attorney, Agent, or Firm* — Knobbe, Martens, Olson & Bear LLP

(57) CLAIM

The ornamental design for a medical dressing, as shown and described.

DESCRIPTION

FIG. 1 is a *top, right-side, and front* perspective [top] view of [one embodiment of] a medical dressing[.];
FIG. 2 is [another] *a top, right-side, and rear* perspective [top] view of the medical dressing of FIG. 1[.];
FIG. 3 is a top plan view of the medical dressing of FIG. 1[.];
FIG. 4 is a bottom *plan* view of the medical dressing of FIG. 1[.];
FIG. 5 is a [far] *left* side *elevation* view of the medical dressing of FIG. 1[.];
FIG. 6 is [near] *a right* side *elevation* view of the medical dressing of FIG. 1[.];
FIG. 7 is a front *elevation* view of the medical dressing of FIG. 1; and,
FIG. 8 is a rear *elevation* view of the medical dressing of FIG. 1.

1 Claim, 8 Drawing Sheets

Figure 1:
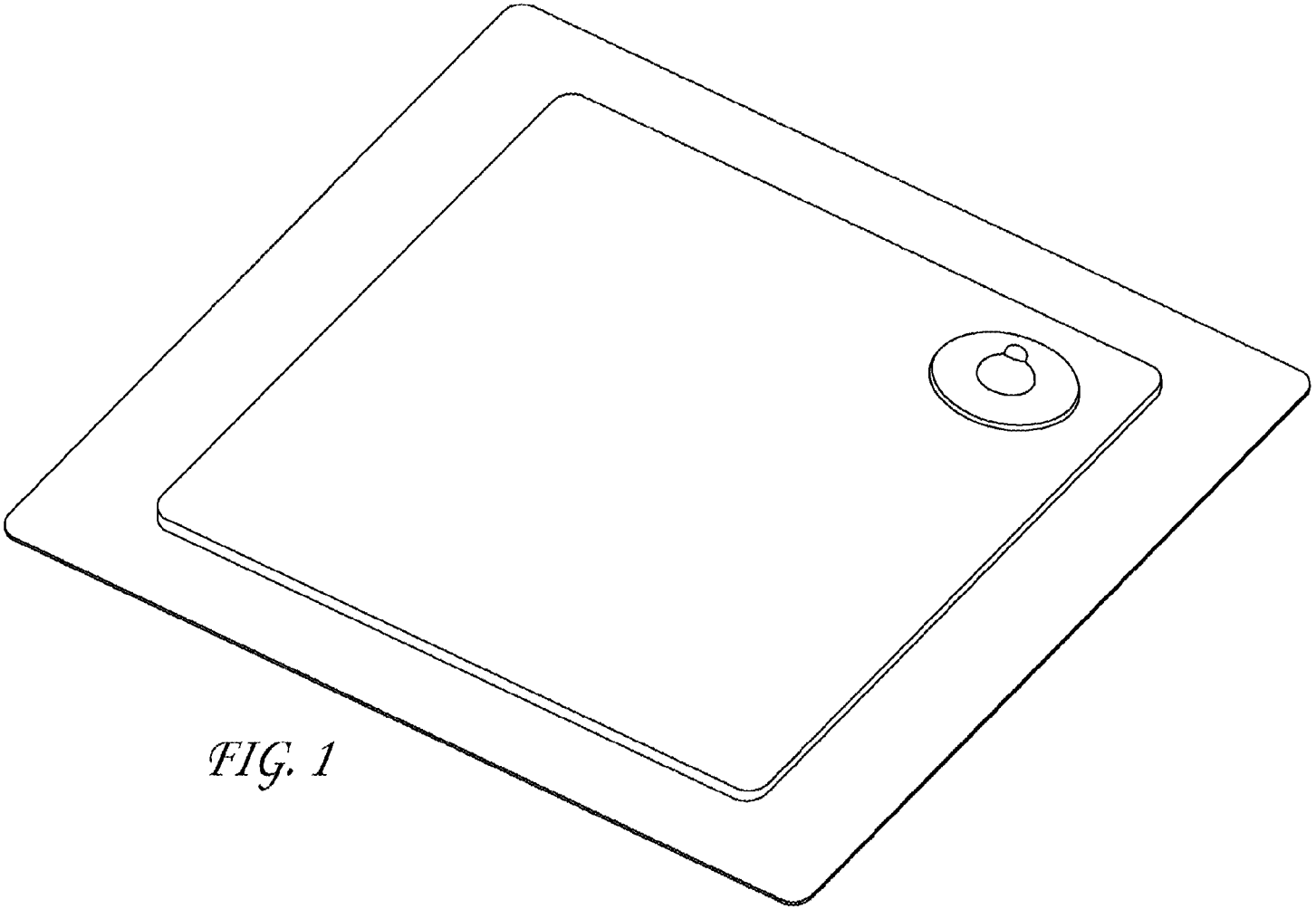
Figure 2:
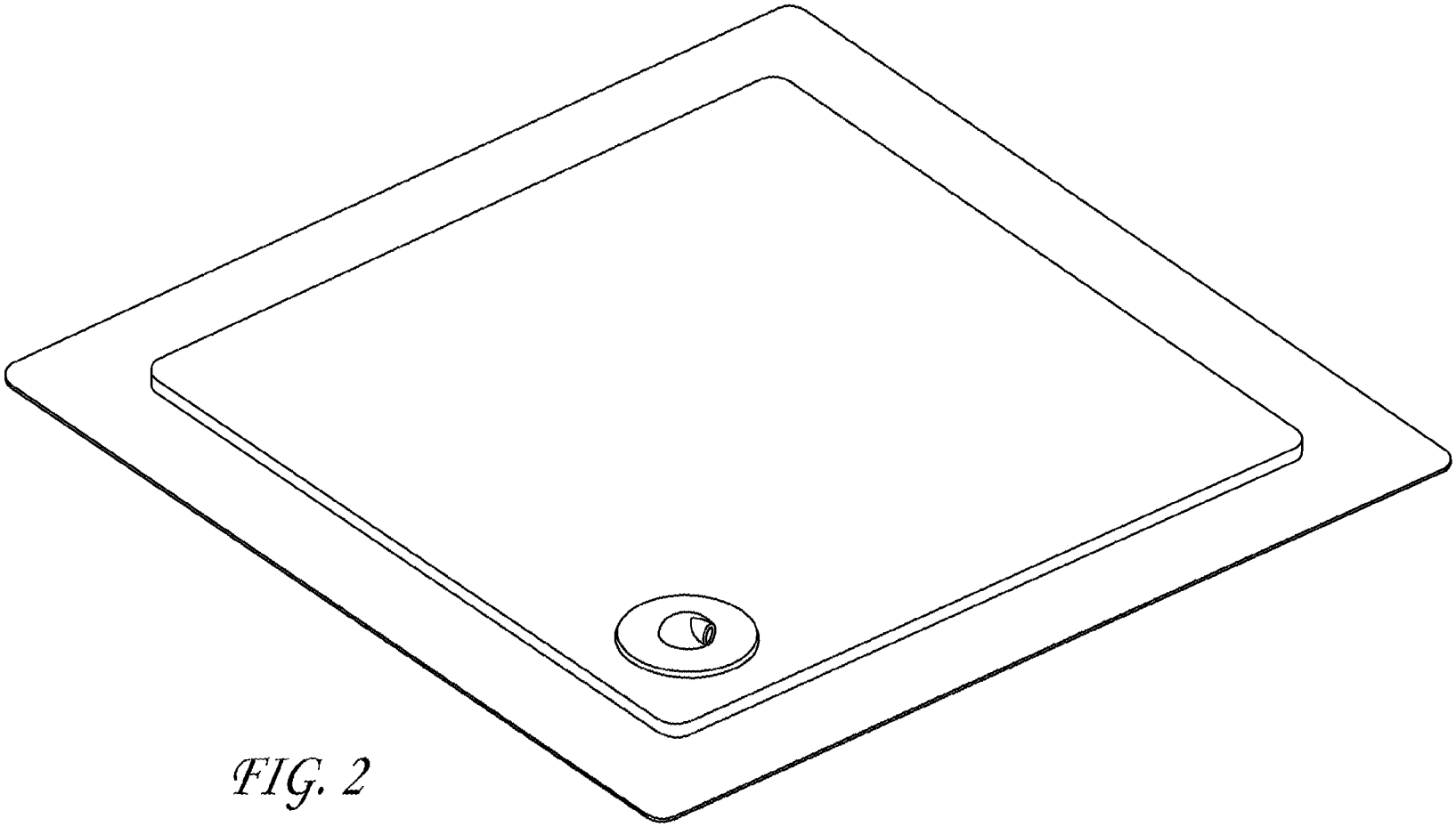
Figure 3:
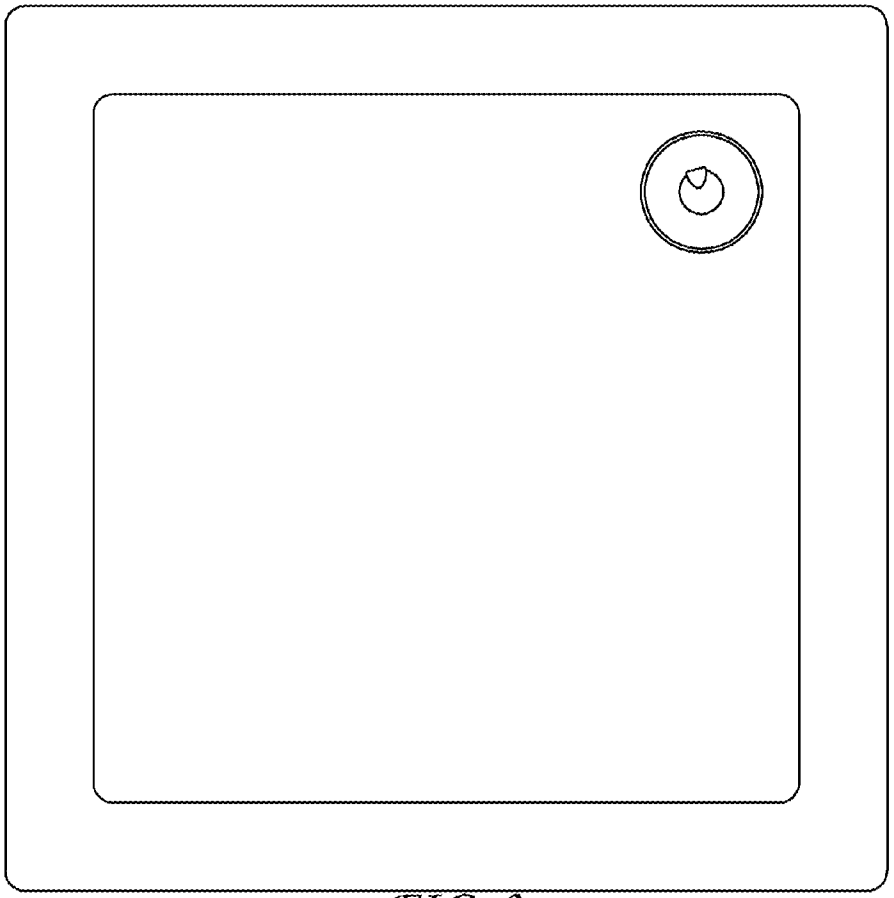
Figure 4:
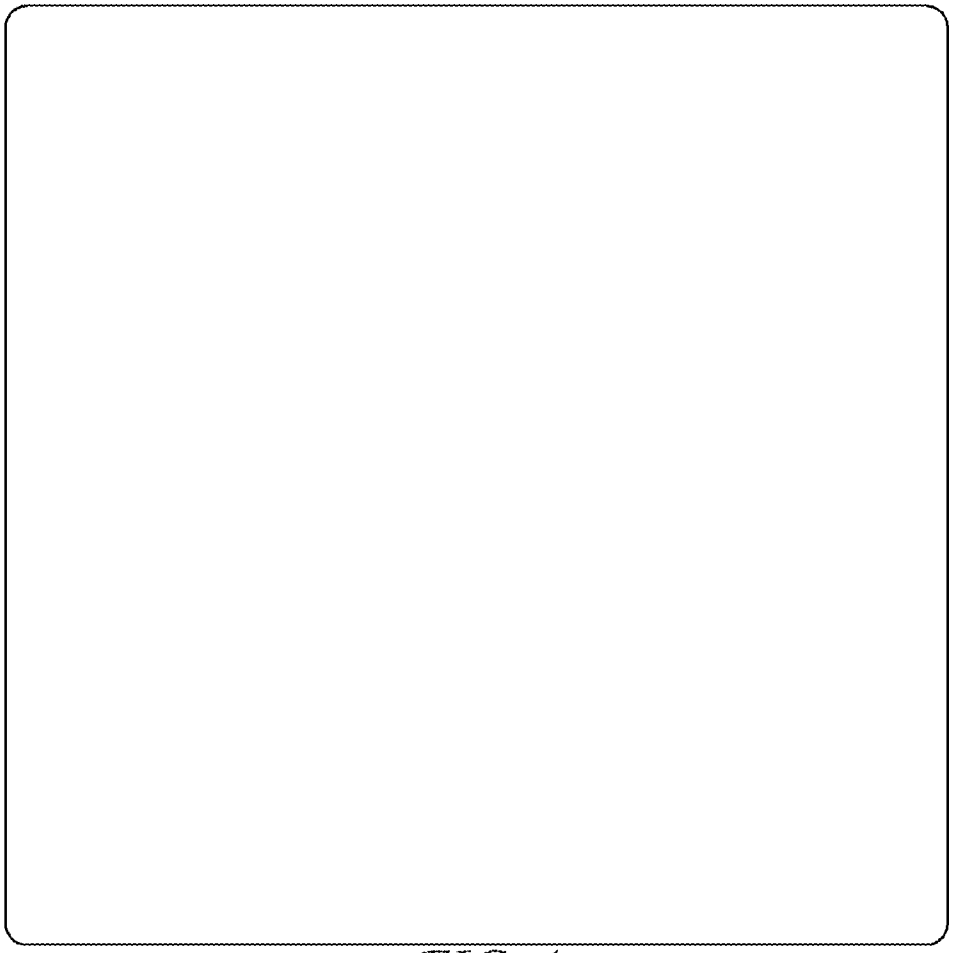
Figure 5:
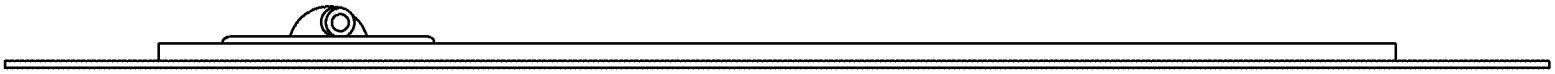
Figure 6:
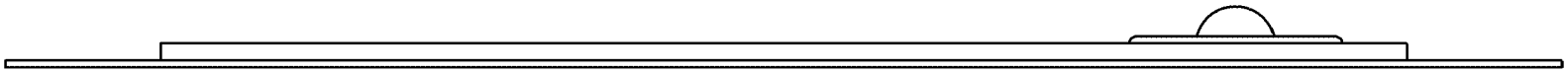
Figure 7:
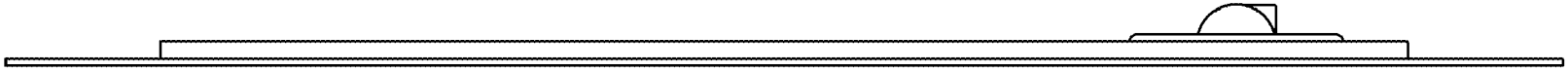
Figure 8:
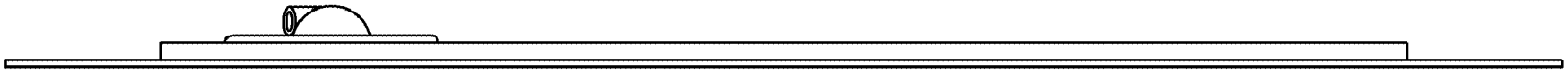

Matter enclosed in heavy brackets [ ] appears in the original patent but forms no part of this reissue; matter printed in italics indicates the additions made by reissue.

(58) Field of Classification Search
CPC ..... A61F 13/02; A61M 1/009; A61M 27/00; A61M 1/0088
See application file for complete search history.

(56) References Cited

U.S. PATENT DOCUMENTS

| | | | | | |
|---|---|---|---|---|---|
| 3,342,183 | A | * | 9/1967 | Edenbaum | 604/307 |
| D267,510 | S | * | 1/1983 | Golub | D24/189 |
| 4,564,010 | A | * | 1/1986 | Coughlan et al. | 604/307 |
| 4,587,146 | A | * | 5/1986 | Anhauser et al. | 428/42.2 |
| 4,627,429 | A | * | 12/1986 | Tsuk | 604/307 |
| D292,826 | S | * | 11/1987 | Sproles | D24/189 |
| 4,808,172 | A | * | 2/1989 | Murata | 604/306 |
| 4,917,112 | A | * | 4/1990 | Kalt | 602/58 |
| 5,052,381 | A | * | 10/1991 | Gilbert et al. | 602/52 |
| 5,056,510 | A | * | 10/1991 | Gilman | 602/52 |
| 5,176,663 | A | | 1/1993 | Svedman et al. | |
| 5,266,371 | A | * | 11/1993 | Sugii et al. | 428/41.5 |
| D352,782 | S | * | 11/1994 | Kirk et al. | D24/189 |
| D357,742 | S | * | 4/1995 | Peery et al. | D24/189 |
| 5,437,651 | A | | 8/1995 | Todd et al. | |
| D362,505 | S | * | 9/1995 | Fabricant | D24/189 |
| D369,907 | S | * | 5/1996 | Sayovitz et al. | D5/53 |
| D370,127 | S | * | 5/1996 | Bonaddio et al. | D5/58 |
| D372,098 | S | * | 7/1996 | Lattin et al. | D24/189 |
| 5,549,584 | A | | 8/1996 | Gross | |
| 5,636,643 | A | | 6/1997 | Argenta et al. | |
| 5,645,081 | A | | 7/1997 | Argenta et al. | |
| D382,343 | S | * | 8/1997 | Wandell et al. | D24/189 |
| D384,745 | S | * | 10/1997 | Lattin et al. | D24/189 |
| D385,038 | S | * | 10/1997 | Shultz | D24/189 |
| D389,581 | S | * | 1/1998 | Fein | D24/189 |
| 5,998,694 | A | * | 12/1999 | Jensen et al. | 602/57 |
| D424,699 | S | * | 5/2000 | Allen | D24/189 |
| 6,071,267 | A | | 6/2000 | Zamierowski | |
| 6,142,982 | A | | 11/2000 | Hunt et al. | |
| 6,345,623 | B1 | | 2/2002 | Heaton et al. | |
| D477,086 | S | * | 7/2003 | Tsuruda et al. | D24/189 |
| 6,648,862 | B2 | | 11/2003 | Watson | |
| 6,685,681 | B2 | | 2/2004 | Lockwood et al. | |
| 6,752,794 | B2 | | 6/2004 | Lockwood et al. | |
| D495,056 | S | * | 8/2004 | Watanabe | D24/189 |
| 6,936,037 | B2 | | 8/2005 | Bubb et al. | |
| D509,299 | S | * | 9/2005 | Watanabe | D24/189 |
| 6,951,553 | B2 | | 10/2005 | Bubb et al. | |
| 7,004,915 | B2 | | 2/2006 | Boynton et al. | |
| 7,108,683 | B2 | | 9/2006 | Zamierowski | |
| 7,195,624 | B2 | | 3/2007 | Lockwood et al. | |
| D571,922 | S | * | 6/2008 | Freeland | D24/189 |
| 7,381,859 | B2 | | 6/2008 | Hunt et al. | |
| D572,367 | S | * | 7/2008 | Freeland | D24/189 |
| D572,824 | S | * | 7/2008 | Propp | D24/189 |
| D572,825 | S | * | 7/2008 | Freeland | D24/189 |
| 7,438,705 | B2 | | 10/2008 | Karpowicz et al. | |
| 7,569,742 | B2 | | 8/2009 | Haggstrom et al. | |
| D600,354 | S | * | 9/2009 | Sachi | D24/189 |
| D604,424 | S | * | 11/2009 | Coubetergues | D24/189 |
| 7,615,036 | B2 | | 11/2009 | Joshi et al. | |
| D605,299 | S | * | 12/2009 | Iwahashi et al. | D24/189 |
| 7,645,269 | B2 | | 1/2010 | Zamierowski | |
| D609,922 | S | * | 2/2010 | Bridges et al. | D5/53 |
| 7,722,582 | B2 | | 5/2010 | Lina et al. | |
| D618,810 | S | * | 6/2010 | Tanigawa et al. | D24/189 |
| D620,122 | S | * | 7/2010 | Cotton | D24/189 |
| D620,123 | S | * | 7/2010 | Igwebuike | D24/189 |
| 7,759,537 | B2 | | 7/2010 | Bishop et al. | |
| 7,759,539 | B2 | | 7/2010 | Shaw et al. | |
| 7,776,028 | B2 | | 8/2010 | Miller et al. | |
| 7,779,625 | B2 | | 8/2010 | Joshi et al. | |
| 7,794,438 | B2 | | 9/2010 | Henley et al. | |
| D625,017 | S | * | 10/2010 | Iwahashi et al. | D24/189 |
| D625,018 | S | * | 10/2010 | Smith et al. | D24/189 |
| D631,166 | S | * | 1/2011 | Leffew et al. | D24/189 |
| 7,959,624 | B2 | | 6/2011 | Riesinger | |
| 7,964,766 | B2 | | 6/2011 | Blott et al. | |
| 7,976,519 | B2 | | 7/2011 | Bubb et al. | |
| D642,594 | S | | 8/2011 | Mattson et al. | |
| 8,152,785 | B2 | | 4/2012 | Vitaris | |
| 8,361,043 | B2 | * | 1/2013 | Hu et al. | 604/319 |
| 8,372,049 | B2 | | 2/2013 | Jaeb et al. | |
| D679,819 | S | * | 4/2013 | Peron | D24/189 |
| D679,820 | S | * | 4/2013 | Peron | D24/189 |
| D705,428 | S | * | 5/2014 | Cheney et al. | D24/169 |
| D705,429 | S | * | 5/2014 | Cheney et al. | D24/169 |
| D713,967 | S | * | 9/2014 | Adoni | D24/189 |
| 8,864,748 | B2 | | 10/2014 | Coulthard et al. | |
| 2004/0241214 | A1 | | 12/2004 | Kirkwood et al. | |
| 2006/0009744 | A1 | | 1/2006 | Erdman et al. | |
| 2008/0167593 | A1 | | 7/2008 | Fleischmann | |
| 2009/0227969 | A1 | | 9/2009 | Jaeb et al. | |
| 2009/0240185 | A1 | | 9/2009 | Jaeb et al. | |
| 2009/0281471 | A1 | * | 11/2009 | Iwahashi et al. | 602/54 |
| 2009/0293887 | A1 | | 12/2009 | Wilkes et al. | |
| 2009/0299340 | A1 | | 12/2009 | Kazala et al. | |
| 2009/0299341 | A1 | | 12/2009 | Kazala et al. | |
| 2009/0312728 | A1 | | 12/2009 | Randolph et al. | |
| 2010/0069858 | A1 | | 3/2010 | Olson | |
| 2010/0069863 | A1 | | 3/2010 | Olson | |
| 2010/0069885 | A1 | | 3/2010 | Stevenson et al. | |
| 2010/0121286 | A1 | | 5/2010 | Locke et al. | |
| 2010/0122417 | A1 | | 5/2010 | Vrzalik et al. | |
| 2010/0125258 | A1 | | 5/2010 | Coulthard et al. | |
| 2010/0210986 | A1 | | 8/2010 | Sanders et al. | |
| 2010/0268198 | A1 | | 10/2010 | Buan et al. | |
| 2010/0305490 | A1 | | 12/2010 | Coulthard et al. | |
| 2010/0305526 | A1 | | 12/2010 | Robinson et al. | |
| 2010/0305549 | A1 | | 12/2010 | Miller et al. | |
| 2010/0324510 | A1 | | 12/2010 | Anderson et al. | |
| 2011/0028918 | A1 | | 2/2011 | Hartwell | |
| 2011/0054421 | A1 | | 3/2011 | Hartwell | |
| 2011/0054423 | A1 | | 3/2011 | Blott et al. | |
| 2011/0087179 | A2 | | 4/2011 | Blott et al. | |
| 2011/0092927 | A1 | | 4/2011 | Wilkes et al. | |
| 2011/0106030 | A1 | | 5/2011 | Scholz | 604/319 |
| 2011/0112492 | A1 | | 5/2011 | Bharti et al. | 604/319 |
| 2011/0172615 | A2 | | 7/2011 | Greener | |
| 2011/0282309 | A1 | | 11/2011 | Adie et al. | |

FOREIGN PATENT DOCUMENTS

| | | | |
|---|---|---|---|
| EP | 2335749 | A1 | 6/2011 |
| WO | WO 99/01173 | | 1/1999 |
| WO | WO 99/01173 | A1 | 1/1999 |
| WO | WO 01/85248 | | 11/2001 |
| WO | WO 01/85248 | A1 | 11/2001 |
| WO | WO 2009/019227 | | 2/2009 |
| WO | WO 2009/019229 | | 2/2009 |
| WO | WO 2009/103031 | | 8/2009 |
| WO | WO 2009/111657 | | 9/2009 |
| WO | WO 2010/033574 | | 3/2010 |
| WO | WO 2010/033574 | A1 | 3/2010 |
| WO | WO 2010/035017 | | 4/2010 |
| WO | WO 2010/072395 | | 7/2010 |
| WO | WO 2010/147533 | | 12/2010 |
| WO | WO 2010/147533 | A1 | 12/2010 |
| WO | WO 2011/019476 | | 2/2011 |
| WO | WO 2011/019476 | A1 | 2/2011 |
| WO | WO 2011/023275 | | 3/2011 |
| WO | WO 2011/023275 | A1 | 3/2011 |

OTHER PUBLICATIONS

Allevyn Would Dressings pamphlet, Smith & Nephew, Inc., 2008.
KCI Licensing, Prevena™ Incision Management System, Jan. 2010.
U.S. Appl. No. 29/389,782, filed Apr. 15, 2011, Peron.
U.S. Appl. No. 13/092,042, filed Apr. 21, 2011.
KCI Licensing, Prevena™ Incision Management System Patient Guide, Jan. 2010.
KCI, Prevena™ Incision Management System Clinician Guide, Jan. 2010.

* cited by examiner